United States Patent
Boxmeyer

(10) Patent No.: US 7,451,145 B1
(45) Date of Patent: Nov. 11, 2008

(54) METHOD AND APPARATUS FOR RECURSIVELY ANALYZING LOG FILE DATA IN A NETWORK

(75) Inventor: James Boxmeyer, Lake Hiawatha, NJ (US)

(73) Assignee: AT&T Corp., New York, NY (US)

( * ) Notice: Subject to any disclaimer, the term of this patent is extended or adjusted under 35 U.S.C. 154(b) by 266 days.

(21) Appl. No.: 11/301,389

(22) Filed: Dec. 13, 2005

(51) Int. Cl.
*G06F 7/00* (2006.01)
*G06F 17/30* (2006.01)
*G06F 15/173* (2006.01)

(52) U.S. Cl. .......................... 707/6; 709/223

(58) Field of Classification Search ................. 707/4–5, 707/6, 101; 713/151, 200; 709/224, 223, 709/206
See application file for complete search history.

(56) References Cited

U.S. PATENT DOCUMENTS

| | | | | |
|---|---|---|---|---|
| 6,055,572 | A * | 4/2000 | Saksena | 709/224 |
| 7,219,131 | B2 * | 5/2007 | Banister et al. | 709/206 |
| 7,249,162 | B2 * | 7/2007 | Rounthwaite et al. | 709/206 |
| 2003/0204741 | A1 * | 10/2003 | Schoen et al. | 713/200 |
| 2005/0273593 | A1 * | 12/2005 | Seminaro et al. | 713/151 |

* cited by examiner

Primary Examiner—Hung T Vy

(57) ABSTRACT

Method and apparatus for processing log data produced by a network is described. In one example, entries in the log data are filtered using a plurality of filters to select first entries from the entries. The first entries are filtered using a plurality of false positive filters associated with the plurality of filters to select second entries from the first entries. Unique IP addresses are identified in the second entries. The entries in the log data are then filtered using the unique IP addresses to select third set entries. The third entries are analyzed to detect one or more patterns.

17 Claims, 4 Drawing Sheets

202 — OBTAIN RAW LOG FILE(S)

204 — FILTER LOG FILE(S) USING PREDEFINED FILTERS TO SELECT FIRST ENTRIES

206 — FILTER FIRST ENTRIES USING FALSE POSITIVE FILTERS ASSOCIATED WITH PREDEFINED FILTERS TO SELECT SECOND ENTRIES

208 — FILTER SECOND ENTRIES USING EVENT FILTER TO PRODUCE MULTIPLE EVENT STREAMS

201

210 — STANDARDIZE FIELD DELIMITERS FOR ENTRIES

212 — IDENTIFY UNIQUE IP ADDRESSES

214 — OBTAIN MACHINE NAME FOR EACH UNIQUE IP ADDRESS

216 — STORE RESULTS IN DATABASE

218 — TIMESTAMP AND DIGITALLY SIGN EACH RESULT FILE

300

US 7,451,145 B1

METHOD AND APPARATUS FOR RECURSIVELY ANALYZING LOG FILE DATA IN A NETWORK

BACKGROUND OF THE INVENTION

1. Field of the Invention

Embodiments of the present invention generally relate to data mining and, more particularly, to a method and apparatus for recursively analyzing log file data in a network.

2. Description of the Related Art

Presently, elements in a network employ various data logging processes to automatically record events in a certain scope in order to provide an audit trail. The network operator may use the audit trail for various purposes, such as diagnosing problems, tracking network access among users, and the like. In particular, a server in a network typically creates and maintains one or more server log files that contain a record of activity performed by the server for client devices. A typical example is a web server that maintains a history of requests received by client devices for web content. The data in a log file may be analyzed to obtain various types of statistics related to the activity of the particular network element.

In one type of log file analysis, network operators track security-related statistics, such as monitoring Internet access by client devices to detect requests for inappropriate or illicit content. Such Internet access monitoring is typically employed in an enterprise setting. Conventional analysis tools for detecting inappropriate Internet use rely on detecting particular words or phrases in log file entries indicative of content that has been deemed inappropriate or illicit for the particular environment. Entries containing such words or phrases are copied and stored in a result file. Such analysis tools, however, generate a substantial number of false matches. In addition, the result file includes an arbitrary sequence of entries without any useful organization of data. Accordingly, there exists a need in the art for an improved method and apparatus for analyzing log file data in a network.

SUMMARY OF THE INVENTION

Method and apparatus for processing log data produced by a network is described. In one embodiment, entries in the log data are filtered using a plurality of filters to select first entries from the entries. The first entries are filtered using a plurality of false positive filters associated with the plurality of filters to select second entries from the first entries. Unique IP addresses are identified in the second entries. The entries in the log data are then filtered using the unique IP addresses to select third set entries. The third entries are analyzed to detect one or more patterns.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a flow diagram depicting an exemplary embodiment of a method for processing log data produced by a network device in accordance with one or more aspects of the invention;

DETAILED DESCRIPTION

Figure 1:
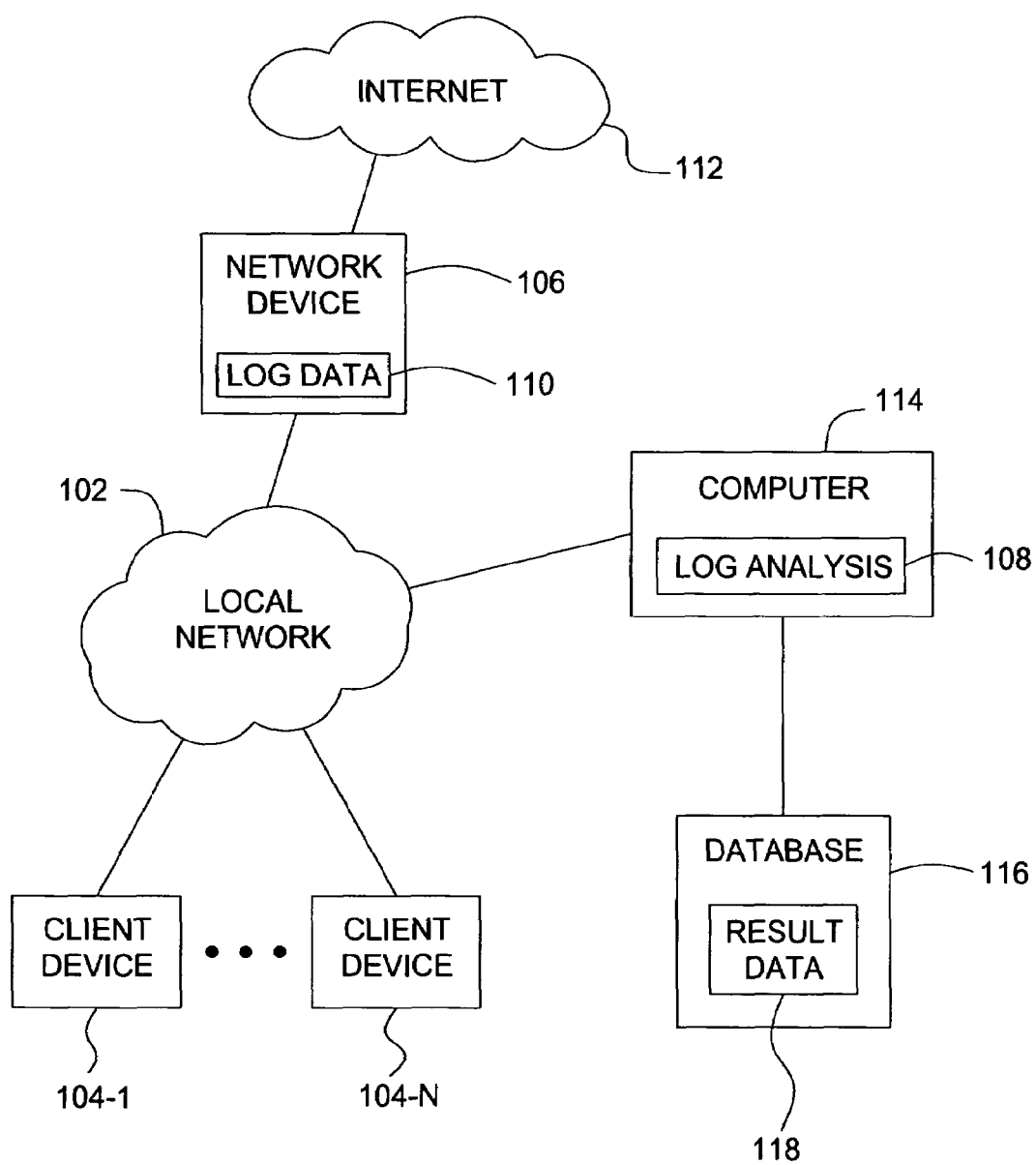
FIG. 1 is a block diagram depicting an exemplary network architecture in accordance with one or more aspects of the invention.

FIG. 1 is a block diagram depicting an exemplary network architecture 100 in accordance with one or more aspects of the invention. The network architecture 100 includes a local network 102, client devices 104-1 through 104-N (collectively client devices 104), a network devices 106, and a computer 114, where N is an integer greater than zero. The client devices 104, the network device 106, and the computer 114 are coupled to the local network 102. The network device 106 is configured for communication with a wide area network 112. In the present embodiment the wide area network 112 is the Internet.

The local network 102 comprises any type of packet transport network known in the art (e.g., an Ethernet network). Data may be communicated over the local network 102 using any type of protocol, such as transmission control protocol/internet protocol (TCP/IP). The client devices 104 may include desktop computers, workstations, and the like. The client devices 104 are configured to access the wide area network 112 via the network device 106. The network device 106 may be a server configured to provide a gateway to the wide area network 112 for the client devices. For example, the network device 106 may comprise a web server, proxy server, or the like. The network device 106 is configured to maintain one or more log files as log data 110. A log file includes entries that list actions that have occurred with respect to the network element 106. For example, a web server maintains log files listing every request made to the server for access to the Internet.

Each log file in the data 110 includes a list of entries, where each entry includes various fields having particular values associated with particular requests handled by the network element. In particular, an entry includes a field indicative of a request made by a client device and an IP address associated with the request. The request field includes a character string indicative of a particular file or object requested. Each log file in the data 110 may be formatted using any type of format known in the art. One exemplary type of format is known as the common log format (CLF). A CLF entry includes fields for a remote host, a remote login name of a user, a username as which a user has authenticated himself, the date and time of a request, the request itself, status of the request, and the number of bytes transferred during the request.

For example, an entry in a log file having a CLF format may be:

127.0.0.1-frank [6/Dec/2005:14:32:15-0600] "GET /picture.gif HTTP/1.0" 200 2326

The IP address 127.0.0.1 is the IP address of the client device that made the request to the server. The hyphen indicates that the remote login name of the user is not available for this request. The value [6/Dec/2005:14:32:15-0600] is the date and time the server finished processing the request. The value "GET /picture.gif HTTP/1.0" is the request line from the client device. In this exemplary request, the method used by the client device is GET, the client requested the resource picture.gif, and the client used the hypertext transfer protocol (HTTP) version 1.0. The value 200 is the status code the server sends back to the client device (a full list of service codes is contained in the HTTP specification, RFC 2616). The value 2326 includes the size of the object returned to the client device. It is to be understood that the log files generated by the network device 106 may have various other formats known in the art.

The computer 114 includes a log analysis module 108 for performing analysis of the log file data 110 generated by the network element 106. The computer 114 obtains the log file data 110 from the network device 106 via the local network 102. The computer 114 is configured to store result data 118 produced by the log analysis module 108 in the database 116. The database 116 may comprise a storage device associated with the computer 114. Alternatively, the database 116 may be more sophisticated and comprise, for example, a server executing any type of well-known database software. For purposes of clarity by example, only a single network device is shown. It is to be understood that the local network 102 may include multiple network devices, each of which maintains one or more log files. The computer 114 may interface with these multiple network devices via the local network 102 to obtain log file data to process.

In accordance with one or more aspects of the invention, the log analysis module 108 analyzes input log file data to detect specific patterns. The rate of false positive matching for the patterns is reduced by using recursive data mining. In one embodiment, the log analysis module 108 processes input log file data in two phases. In a first phase, entries in the log file data that include predefined character strings are identified. Unique IP addresses for the identified entries are also identified. In one embodiment, machine names associated with the IP addresses obtained. The identified entries are organized based on the unique IP addresses/machine names and stored in a database. In a second phase, entries in the log file data that include the unique IP addresses obtained in the first phase are identified. In this manner, all activity associated with each of the unique IP addresses may be identified. The entries identified in the second phase may be filtered based on particular event types. The identified entries may be organized based on IP address/event type and stored in a database.

FIG. 2 is a flow diagram depicting an exemplary embodiment of a method 200 for processing log data produced by a network device in accordance with one or more aspects of the invention. The method 200 may be performed during the first phase of analysis performed by the log analysis module 108. The method 200 begins at step 202, where one or more raw log files are obtained from one or more network devices. The log files are "raw" in that they have not been processed or re-formatted. At step 204, the log files are filtered using a plurality of filters to select first entries. Each of the plurality of filters comprises a specific string of ascii characters. For example, the filters may include words or phrases indicative of material that has been flagged by the network operator as being inappropriate for the setting in which the network is deployed. Each entry in the log files is processed to determine if the entry includes any of the character strings specified by the filters. For example, the character strings may be located in the request field. Entries containing such character strings are extracted to form a first group of entries (referred to as the first entries). Step 204 is referred to as the first pass filter.

At step 206, the first entries are filtered using false positive filters associated with the plurality of filters to select second entries. Each of the false positive filters comprises a specific character string that is not indicative of inappropriate material, but its inclusion in an entry is known to cause the entry to be extracted by the first pass filter step 204. For example, assume the word "virgin" comprises one of the filters employed in the first pass. Such a filter captures entries that include the word "virgin", as well as other words with that character string, such as "Virginia". If the word "Virginia" is not one of the filters employed in the first pass, the capture of an entry with the word "Virginia" is a false positive. Thus, the character string "Virginia" may be employed as a known false positive filter. Those entries in the first entries that contain character strings indicative of false positives are removed from the first entries to form a second group of entries (referred to as the second entries).

At optional step 208, the second entries are filtered using an event filter to produce a plurality of streams of entries ("event streams"). The event filter is configured to categorize the second entries based on specific types of events. For example, one type of event may be particular time associated with a request recorded in an entry. Entries having a time after 12:00 PM are output as one stream, and entries having a time before 12:00 PM are output as another stream. Other types of events include whether a request resulted in a connection, whether a request was denied, and whether the request resulted in an error. Thus, entries having requests resulting in a connection are output in one stream, entries having requests that were denied are output in another stream, and entries having requests that resulted in errors are output as yet another stream. Those skilled in the art will appreciate that various other types of events may be employed by the event filter. The event filter may filter for any number of event types to produce any number of event streams. In another embodiment, step 208 is omitted and the second entries are processed as a single group.

The method 200 proceeds to execute step 201. If multiple event streams are produced at step 208, then the method 201 may be executed concurrently for each event stream. Alternatively, the event streams may be processed serially. If step 208 is omitted, then the method 201 operates of the second entries as a single group. The method 201 begins at step 210, where the field delimiters for the input entries are standardized. The entries may be formatted into a standard delimited format to assist in further processing. At step 212, unique IP addresses are identified from the input entries. As described above, each entry includes an IP address of a particular client device making the request recorded in the entry. There may be several entries in the stream that have the same IP address. The input entries are processed to identify the unique IP addresses.

At step 214, a machine name associated with each unique IP address is obtained. For example, each unique IP address may be scanned to obtain a corresponding machine name that identifies a client device using that IP address for a given session. The machine names attached to the unique IP addresses may be used to assist in collection of metrics per client device for historical monitoring. At step 216, results of the process 201 are stored in a database. The results comprise one or more result files produced steps of the process 201. For example, a result file may be produced at step 210 that includes the formatted entries. A result file may be produced at step 212 that includes the unique IP address identified. A result file may be produced at step 214 that includes unique IP address and corresponding machine names. A result file may also be produced that includes the input entries organized in terms of IP address/machine name. At optional step 218, each result file is time-stamped and digitally signed to ensure that integrity is maintained. Processes for digitally signing files are well-known in the art.

Figure 3:
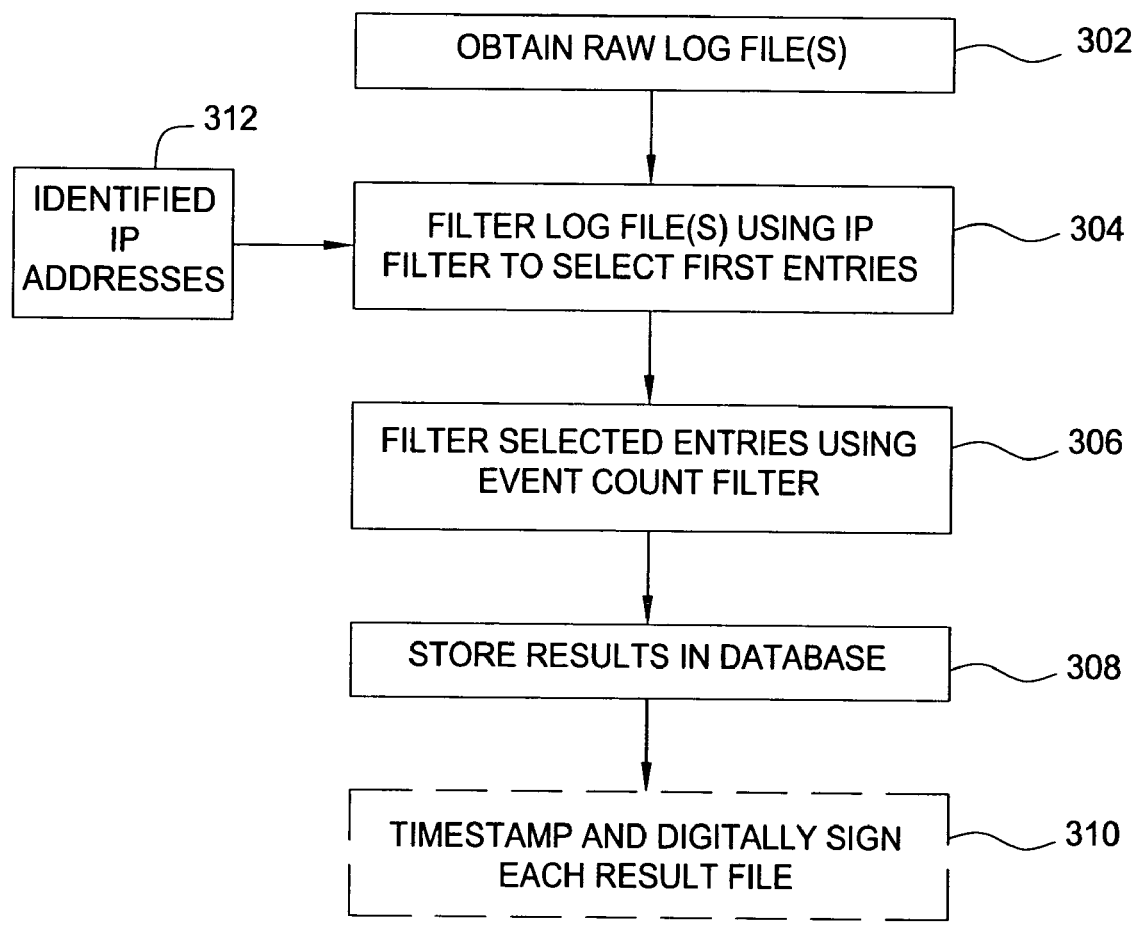
FIG. 3 is a flow diagram depicting an exemplary embodiment of a method for processing log data produced by a network device in accordance with one or more aspects of the invention.

FIG. 3 is a flow diagram depicting an exemplary embodiment of a method 300 for processing log data produced by a network device in accordance with one or more aspects of the invention. The method 300 may be performed during the second phase of analysis performed by the log analysis module 108. The method 300 begins at step 302, where one or more raw log files are obtained from one or more network devices. At step 304, the log file(s) are filtered using an IP filter configured with IP addresses of interest to select entries. The IP addresses of interest are obtained at step 312. The IP addresses of interest may comprise the unique IP addresses identified during the method 200 (e.g., the first analysis phase). At step 306, the selected entries are filtered using an event count filter. That is, each event type is counted for a given IP address (e.g., a particular IP address had 100 requests that resulted in a connection). The event count filter may be configured to count occurrences of any number of event types for the entries.

At step 308, the results are stored in a database. The results comprise one or more result files produced steps of the method 300. For example, a result file may be produced at step 304 that includes the selected entries organized based on IP address. A result file may be produced at step 306 that includes the counts of event types for the IP addresses. At optional step 310, each result file is time-stamped and digitally signed to ensure that integrity is maintained.

Figure 4:
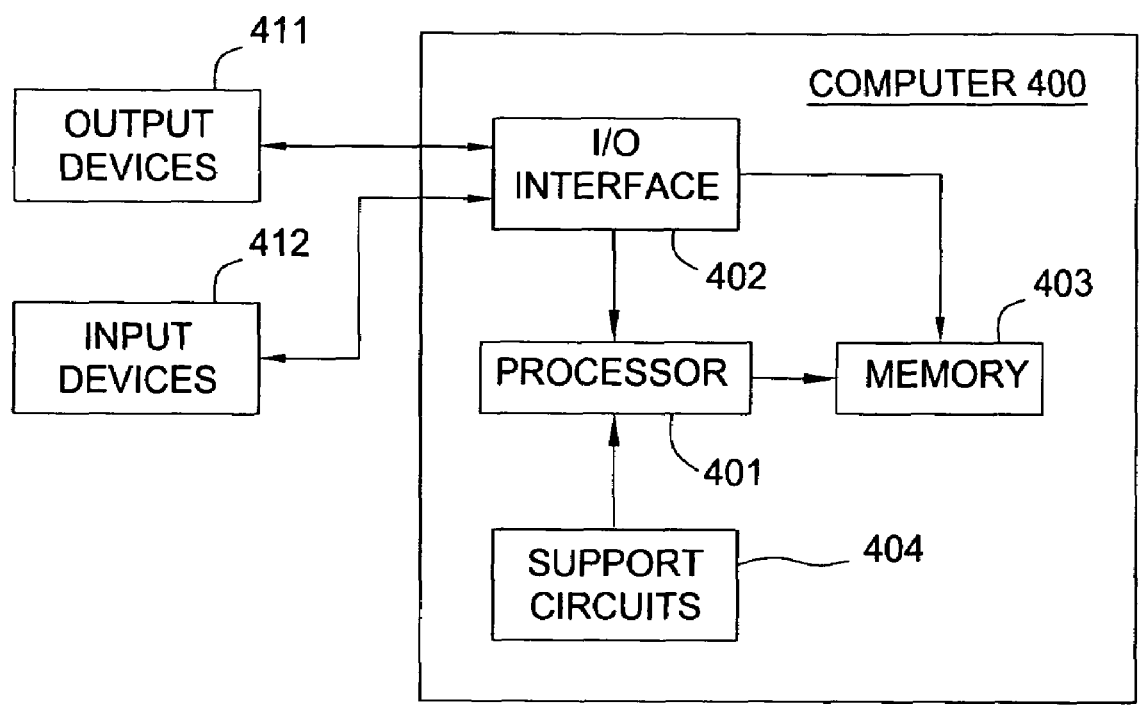
FIG. 4 is a block diagram depicting an exemplary embodiment of a computer suitable for implementing the processes and methods described herein.

FIG. 4 is a block diagram depicting an exemplary embodiment of the computer 114 configured to implement the processes and methods described herein. The computer 114 includes a processor 401, a memory 403, various support circuits 404, and an I/O interface 402. The processor 401 may be any type processing element known in the art, such as a microprocessor. The support circuits 404 for the processor 401 include conventional cache, power supplies, clock circuits, data registers, I/O interfaces, and the like. The I/O interface 402 may be directly coupled to the memory 403 or coupled through the processor 401. The I/O interface 402 may be coupled to various input devices 412 and output devices 411, such as a conventional keyboard, mouse, printer, and the like.

The memory 403 may store all or portions of one or more programs and/or data to implement the processes and methods described herein. Notably, the memory 403 may store program code to be executed by the processor 401 for performing the method 200 of FIG. 2 and the method 300 of FIG. 3. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 114 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of processing log data produced by a network, comprising:
   filtering entries in the log data using a plurality of filters to select first entries from the entries;
   filtering the first entries using a plurality of false positive filters associated with the plurality of filters to select second entries from the first entries;
   identifying unique internet protocol (IP) addresses in the second entries, wherein said identifying comprises:
      separating the second entries into a plurality of streams based on a respective plurality of event types;
   for each stream of the plurality of streams:
      identifying a set of unique IP addresses in the each stream of the plurality of streams; and
      obtaining corresponding machine names for each IP address in the set of unique IP addresses;
   filtering the entries in the log data using the unique IP addresses to select third entries from the entries; and
   analyzing the third entries to detect one or more patterns.

2. The method of claim 1, further comprising:
   formatting the each stream of the plurality of streams into a delimited format prior to the step of identifying the set of unique IP addresses in the each stream of the plurality of streams.

3. The method of claim 2, further comprising at least one of:
   storing results of the formatting step for the stream in a first results file; and
   storing results of the obtaining step for the stream in a second results file.

4. The method of claim 1, wherein the step of analyzing comprises:
   determining a count of the third entries corresponding to each of a plurality of event types; and
   storing results of the determining step in a results file.

5. The method of claim 1, further comprising:
   storing results of the step of filtering using the unique sets of IP addresses in a results file.

6. The method of claim 1, further comprising:
   storing results of the analyzing step in a results file;
   time stamping the results file; and
   digitally signing the results file using a cryptographic key.

7. The method of claim 1, wherein the log data comprises a plurality of logs produced by one or more internet protocol (IP) devices in the network.

8. Apparatus having a processor for processing log data produced by a network, comprising:
  means for filtering entries in the log data using a plurality of filters to select first entries from the entries;
  means for filtering the first entries using a plurality of false positive filters associated with the plurality of filters to select second entries from the first entries;
  means for identifying unique internet protocol (IP) addresses in the second entries, wherein the means for identifying comprises:
    means for separating the second entries into a plurality of streams based on a respective plurality of event types;
    means for identifying a set of unique IP addresses for each stream of the plurality of streams; and
    means for obtaining corresponding machine names for each IP address in the set of unique IP addresses for each stream of the plurality of streams;
  means for filtering the entries in the log data using the unique IP addresses to select third entries from the entries; and
  means for analyzing the third entries to detect one or more patterns.

9. The apparatus of claim 8, further comprising:
  means for formatting the each stream of the plurality of streams into a delimited format prior to the step of identifying the set of unique IP addresses in the each stream of the plurality of streams.

10. The apparatus of claim 9, further comprising at least one of:
  means for storing results of the formatting step for the stream in a first results file; and
  means for storing results of the obtaining step for the stream in a second results file.

11. The apparatus of claim 8, wherein the means for analyzing comprises:
  means for determining a count of the third entries corresponding to each of a plurality of event types; and
  means for storing results of the determining step in a results file.

12. The apparatus of claim 8, further comprising:
  means for storing results of the step of filtering using the unique sets of IP addresses in a results file.

13. A computer readable medium having stored thereon instructions that, executed by a processor, cause the processor to perform a method of processing log data produced by a network, comprising:
  filtering entries in the log data using a plurality of filters to select first entries from the entries;
  filtering the first entries using a plurality of false positive filters associated with the plurality of filters to select second entries from the first entries;
  identifying unique internet protocol (IP) addresses in the second entries, wherein the step of identifying comprises:
    separating the second entries into a plurality of streams based on a respective plurality of event types;
    for each stream of the plurality of streams:
      identifying a set of unique IP addresses in the each stream of the plurality of streams; and
      obtaining corresponding machine names for each IP address in the set of unique IP addresses;
  filtering the entries in the log data using the unique IP addresses to select third entries from the entries; and
  analyzing the third entries to detect one or more patterns.

14. The computer readable medium of claim 13, further comprising:
  formatting the each stream of the plurality of streams into a delimited format prior to the step of identifying the set of unique IP addresses in the each stream of the plurality of streams.

15. The computer readable medium of claim 14, further comprising at least one of:
  storing results of the formatting step for the stream in a first results file; and
  storing results of the obtaining step for the stream in a second results file.

16. The computer readable medium of claim 13, wherein the step of analyzing comprises:
  determining a count of the third entries corresponding to each of a plurality of event types; and
  storing results of the determining step in a results file.

17. The computer readable medium of claim 13, further comprising:
  storing results of the analyzing step in a results file;
  time stamping the results file; and
  digitally signing the results file using a cryptographic key.

* * * * *